Figure 1:
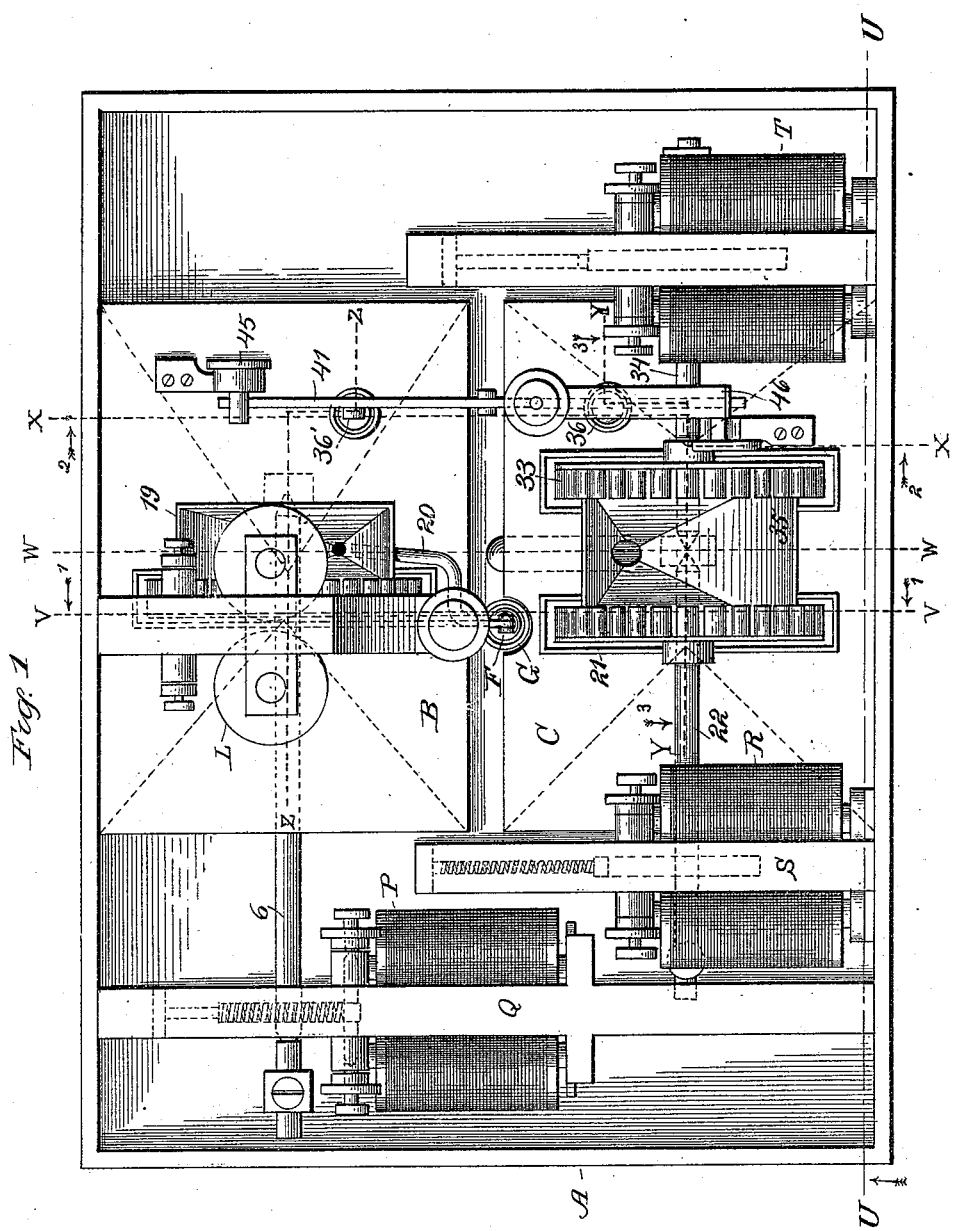

(No Model.)

T. B. DIXON.
REGISTER.

5 Sheets—Sheet 1.

No. 553,642. Patented Jan. 28, 1896.

Witnesses.
Victor J. Evans.
W. B. Dixon

Inventor.
T. B. Dixon.
By E. M. Marble & Sons
Attorneys (No Model.)　　　　　　　T. B. DIXON.　　　　　5 Sheets—Sheet 2.
REGISTER.

No. 553,642.　　　　　　　　　　　Patented Jan. 28, 1896.

Witnesses.　　　　　　　　　　　　　　　Inventor.
Victor J. Evans.　　　　　　　　　　　　T. B. Dixon.
W. T. B. Dixon　　　　　　　　　By E. M. Marble & Sons
　　　　　　　　　　　　　　　　　　　　Attorneys.

(No Model.)  
5 Sheets—Sheet 3.
T. B. DIXON.
REGISTER.
No. 553,642.  
Patented Jan. 28, 1896.
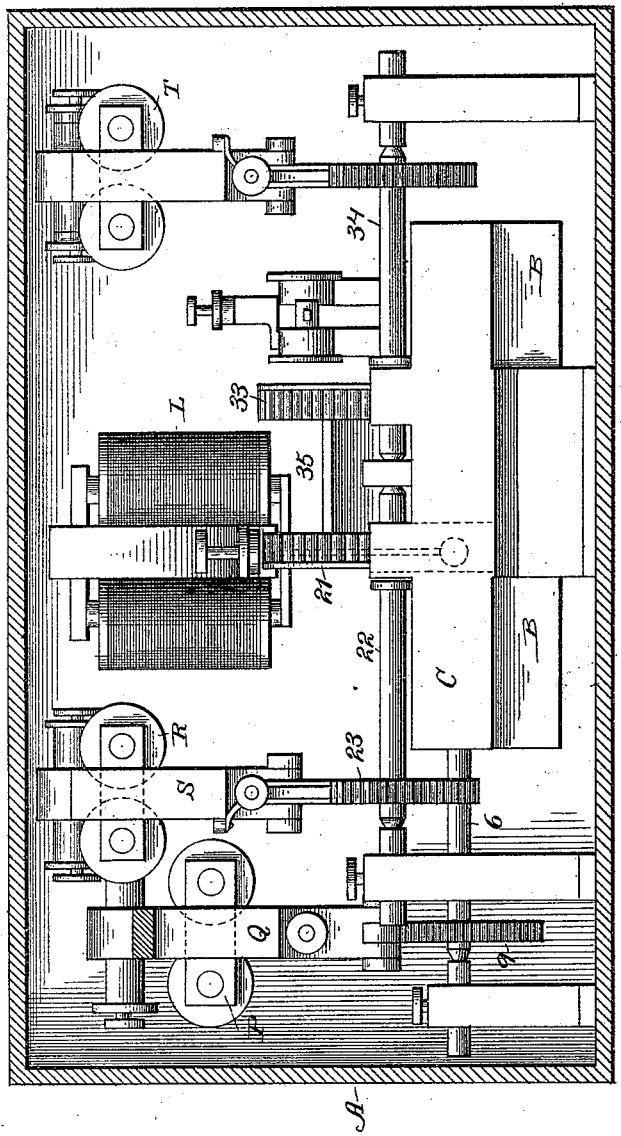
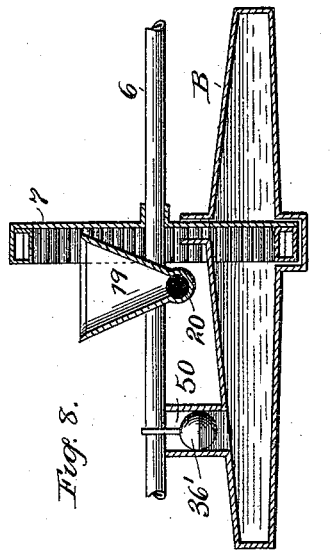
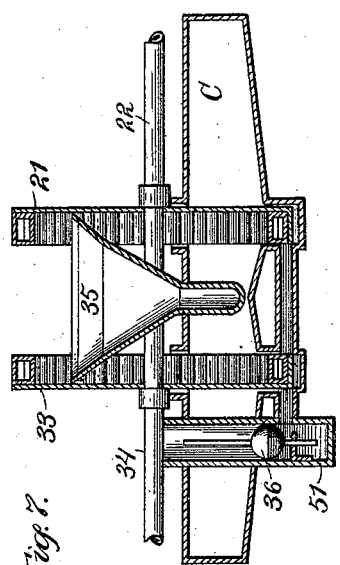
Witnesses.  
Victor J. Evans.  
W. B. Dixon
Inventor.  
T. B. Dixon.  
By E. M. Marble & Sons  
Attorneys.

(No Model.)  T. B. DIXON.  5 Sheets—Sheet 4.
REGISTER.

No. 553,642.  Patented Jan. 28, 1896.

Witnesses  Inventor.
Victor J. Evans.  T. B. Dixon.
W. B. Dixon  By E. M. Marble & Sons
  Attorneys (No Model.)

T. B. DIXON.
REGISTER.

No. 553,642.  Patented Jan. 28, 1896.

Witnesses.
Victor J. Evans.
W. B. Dixon

Inventor.
T. B. Dixon.
By E. M. Marble & Sons
Attorneys.

UNITED STATES PATENT OFFICE.

THOMAS B. DIXON, OF HENDERSON, KENTUCKY.

REGISTER.

SPECIFICATION forming part of Letters Patent No. 553,642, dated January 28, 1896.

Application filed August 20, 1894. Serial No. 520,812. (No model.)

*To all whom it may concern:*

Be it known that I, THOMAS B. DIXON, a citizen of the United States, residing at Henderson, in the county of Henderson and State of Kentucky, have invented certain new and useful Improvements in Registers; and I do hereby declare the following to be a full, clear, and exact description of the invention, such as will enable others skilled in the art to which it appertains to make and use the same.

My invention relates to counters or registers used to automatically record or register each and all of a number of occurrences of a particular character, and it relates particularly to improvements in electrically-operated registers or counters, and to that class of registers which are used in connection with automatic railway block-signaling systems to register the wheels of a train as it passes into a block, and to cancel the record so made of the wheels as they pass out of the block, the register being so connected with the signal-circuits that the signals set to "danger" when the train enters the block cannot be returned to "safety" until the same number of wheels have passed out of this block that first passed into it.

I have filed another application for Letters Patent for improvements in registers, Serial No. 500,169, dated February 14, 1894, covering what I term my "mechanical register," in contradistinction to the register herein described, which I term my "liquid register," the first-named or mechanical register being also intended to be used in connection with the circuits of electrical railway signaling systems. The two registers may be used interchangeably in any signal system using registers, though in general the use of the mechanical register is preferable because of its greater simplicity. The herein-described liquid register, however, is especially useful in complicated situations on railways where, because of the number of tracks, signals, circuits, or other cause, it may be necessary to use more canceling or registering mechanisms in the register than can be provided in my mechanical register.

The objects of my invention are, first, to provide a register or counter which is adapted to work in connection with electrical railway-signals and to perform the functions above described; second, to provide a register or counter which shall be capable of unfailingly registering the passage of the wheels of a train into a block, and canceling the passage of the wheels of the train out of the block, no matter whether the wheels pass out of the block at the same end at which they entered or at the opposite end, or whether part pass out at one end and part pass out at the other end, either at different times or simultaneously; third, to so construct the parts of the register that they shall be able to move with sufficient rapidity to register wheels moving at high speed; fourth, to so construct and arrange the parts of the register as to make it strong, simple, as inexpensive as possible, not liable to derangement, certain in action, and capable of unfailingly canceling the same number of wheels that have been registered if the same number of canceling impulses are received; fifth, to provide a register in which the registering and canceling mechanisms may be multiplied to any extent desired in order to provide the requisite number of registering or canceling mechanisms in one register to be used in complicated situations on a railway; sixth, to provide means for so controlling the signal-circuits from the register that the signals must be at "danger" so long as the register has a wheel registered upon it. These objects are attained in the register herein described, and illustrated in the drawings which accompany and form a part of this application, in which the same reference letters and numerals indicate the same or corresponding parts, and in which—

Figure 2:
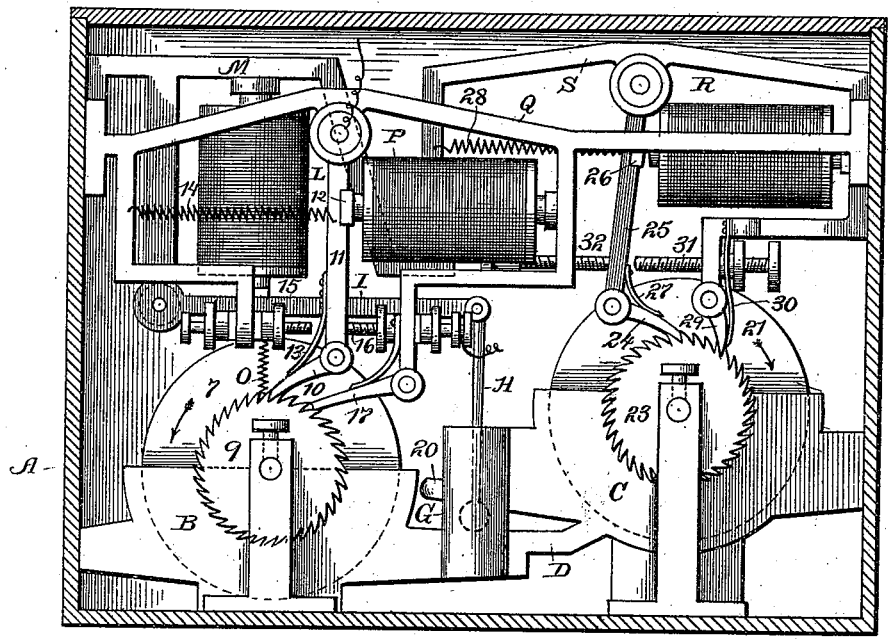
Figure 4:
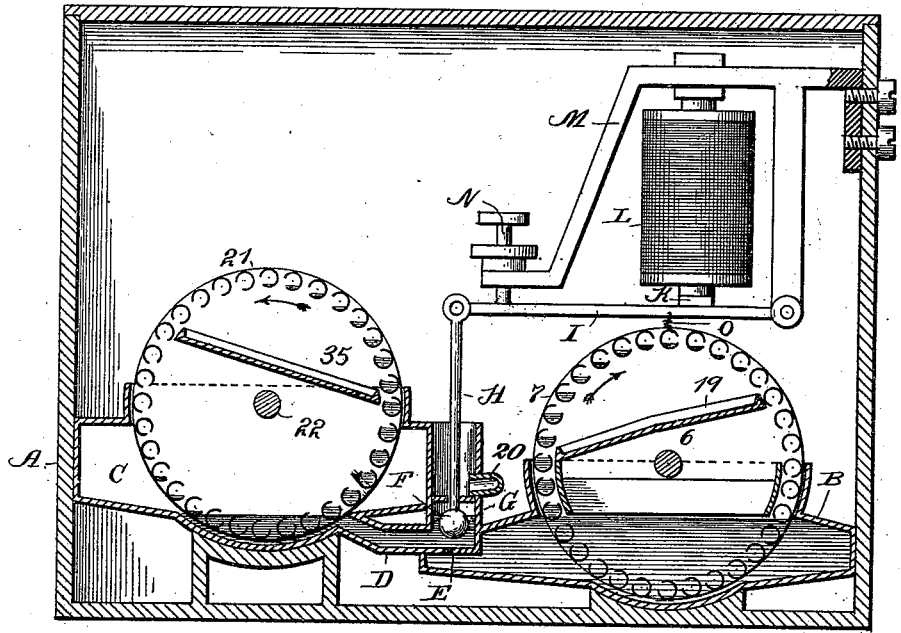
Figure 5:
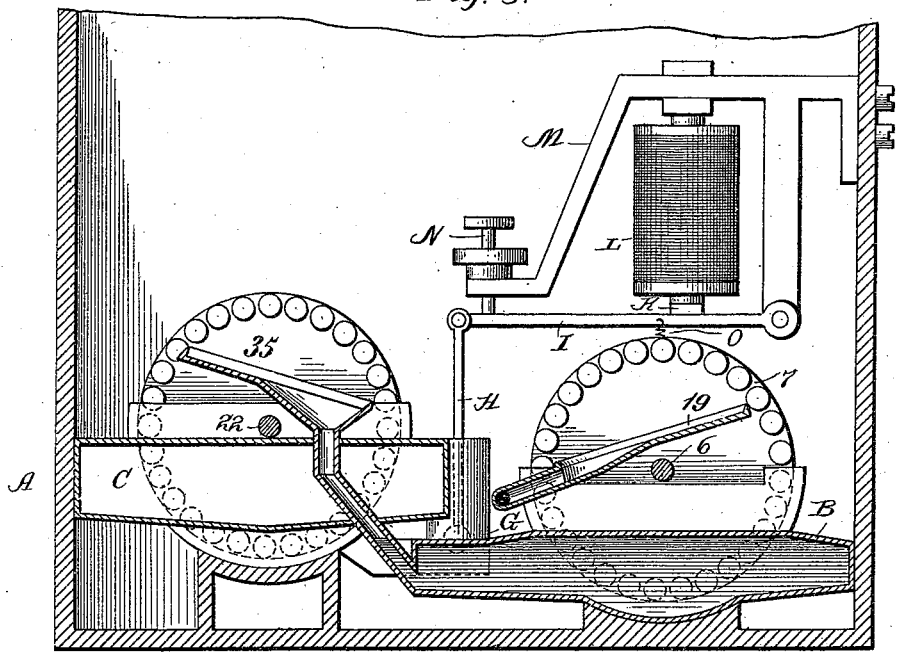
Figure 6:
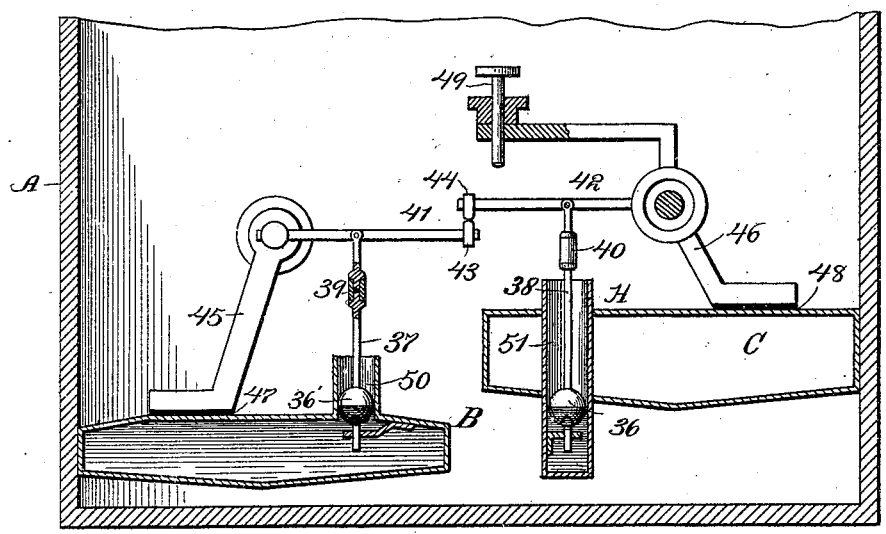
Figure 9:
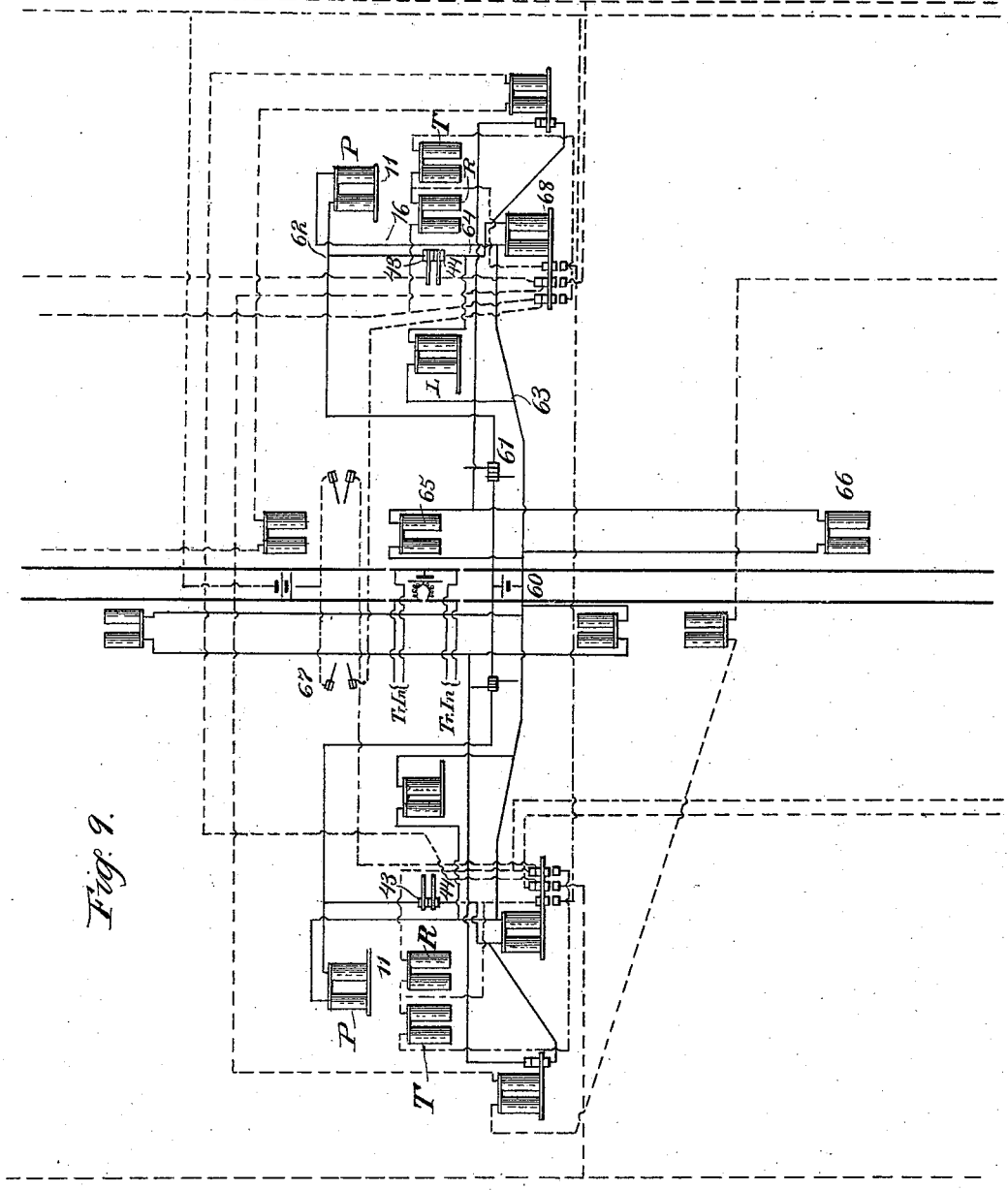

Figure 1 is a plan view of the register with the cover of the protecting-case removed, showing the interior mechanism. Fig. 2 is an end elevation looking from the left of Fig. 1, with the end of the register-case removed, and shows the reservoirs, bucket-wheels, the step-by-step mechanism for operating the bucket-wheels, and the valve between the reservoirs with its operating mechanism. Fig. 3 is a longitudinal sectional elevation taken on the line U U of Fig. 1, and showing the principal portion of the mechanism of the register in side elevation. Fig. 4 is a sectional elevation taken on the line V V of Fig. 1, looking to the left in the direction of the arrows 1 1. It shows in detail the bucket-wheels and the valve between the reservoirs. Fig. 5 is a sectional elevation taken on the line W W of Fig. 1, in the same direction as Fig. 4. It shows the means of communication from one bucket-wheel to the opposite reservoir. Fig. 6 is a sectional elevation taken on the line X X of Fig. 1, looking to the right, in the direction of the arrows 2 2, and shows the contact-points for controlling the signal-circuit, with their supports and floats. Fig. 7 is a sectional detail view of one of the reservoirs and bucket-wheels working therein, taken on the irregular section-line Y Y, looking in the direction of the arrows 3 3. Fig. 8 is a sectional detail view of the other reservoir, taken on the irregular section-line Z Z. Fig. 9 is a diagrammatic view of a signal-station on a single-track railway, with the signals, track-instrument, registers, and circuits for operating those signals, the system of signaling illustrated being a system of my invention which forms the subject-matter of an application for Letters Patent of even date herewith. Fig. 9 shows particularly the circuits for operating the valve-magnets.

The following is the general plan of operation of my register: There are two reservoirs holding mercury or other fluid, which are in communication through a pipe provided with a valve, which valve is normally open, but which is instantly closed when the register begins to operate, and remains closed so long as any portion of a train remains registered upon the register. In each of these reservoirs are one or more wheels provided with buckets which are adapted each to raise a small quantity of mercury when the wheel to which they are attached is revolved, and to discharge its load of mercury into an inclined passage which leads to the other reservoir. These bucket-wheels are operated by suitable step-by-step mechanisms which raise one bucket above the surface of the mercury each time their corresponding mechanisms are operated, and the circuits and track-instrument are usually so arranged that each pair of wheels in passing over the track-instrument operate proper registering and canceling mechanisms. Suitable contact-points are operated by variations in level of the mercury in the reservoirs, and through these contact-points a signal-controlling circuit passes. One of the two reservoirs is somewhat elevated above the other, and the passage of a train over the corresponding track-instrument transfers a certain number of buckets of mercury, corresponding to the number of wheels in the train, from the lower reservoir to the higher, thus separating the contact-points. The passage of the train out of the block transfers a certain number of buckets of mercury from the higher reservoir to the lower, according to the number of wheels that pass out of the block, and when the same number of wheels have passed out of the block that passed into it the level of the mercury in the two reservoirs is the same as at the first, and the contact-points are brought together.

In the drawings, A is the box or case which incloses and protects the mechanism of the register.

B and C are two reservoirs for mercury, the bottom of C being placed about on a level with the normal height of the mercury in B. These reservoirs are covered, the covers having openings in them for the bucket-wheels and for the contact-floats, as will be seen hereinafter. A pipe D runs from the reservoir C to a valve-chamber G, which has in its bottom an opening E communicating with the reservoir B. This opening forms the valve-seat for the valve-plug F, which is carried on a valve-rod H, pivotally attached to the lever I. The lever I is the armature-lever of the valve-magnet L, and carries the armature K. The valve-magnet is supported by a frame M attached to the walls of the case A. A set-screw N limits the upward movement of the lever I, the valve-seat E and valve-plug F serving to limit the downward motion. A spring O tends to draw down the armature-lever I.

7 is the registering bucket-wheel, working in the reservoir B. It is keyed to the shaft 6, which is supported at its ends in laterally-adjustable conical bearings, and to which is secured the ratchet-wheel 9. Engaging with the ratchet-wheel 9 is a pawl 10, pivotally secured to the armature-lever 11, whose magnet is supported by the framework Q, secured to the sides of the case A. A spring 13 tends to press the pawl down, and a spring 14 tends to pull the armature-lever 11 away from magnet P. Screws 15 and 16 limit the motion of the armature-lever 11.

19 is an apron which is so placed as to receive the mercury as it drops from the buckets of the wheel 7 when, by the revolution of the wheel, the buckets are brought to the discharging position. The sides of this apron slope inward toward the center, and in this central depressed portion is a pipe 20, which leads to the valve-chamber G, this valve-chamber being in direct communication with the reservoir C, as before stated. Therefore mercury deposited in the apron 19 flows through the pipe 20 into the valve-chamber 6 and thence to the reservoir C.

21 is a bucket-wheel similar to the bucket-wheel 7 and working in the reservoir C. It is keyed to the shaft 22, which shaft is suitably supported at the ends in conical bearings. The shaft 22 has secured to it the ratchet-wheel 23. Engaging with this ratchet-wheel 23 is a pawl 24, pivotally secured to the armature-lever 25, which is pivotally mounted and which carries the armature 26 of the canceling-magnet R. The magnet R is supported by the framework S attached to the walls of the case A. A spring 27 tends to pull the pawl 24 down, and a spring 28 tends to pull the armature-lever 25 away from the magnet R. A pawl 29, having spring 30, holds the wheel 23 when released by the pawl 24. The motion of the lever 25 is limited by the set-screws 31 and 32.

33 is a bucket-wheel similar to 21, mounted on the shaft 34 and operated from the magnet T by means similar to that employed to operate the wheel 21 from the magnet R. The magnet T is the reverse canceling-magnet— i. e., it cancels for trains going out of the block at the same end at which they entered, while the magnet R cancels for trains going out of the block at the opposite end from that at which they entered.

The use of the two magnets and bucket-wheels is necessitated by the fact that a train entering a block at one end may be cut in two, part going on through the block, and so out, while part may go out at the same end of the block at which it entered, and both parts of the train may be leaving the block at the same time. It is therefore necessary to provide for the simultaneous canceling of the train for both directions at once.

The shafts 22 and 34 are supported by bearings in the same post at their inner ends, their outer ends having bearings which are laterally adjustable as with the shaft 6. Both bucket-wheels 21 and 33 discharge into the same apron 35, which is similar in construction to the apron 19, and which has a pipe leading to the reservoir B direct. Mercury carried up by either of the wheels 21 or 33 and dropped into the apron 35 is carried, therefore, back to the reservoir B.

In order to insure that the buckets shall always be filled completely, even when there is but little mercury in the reservoirs, the bottoms of the reservoirs are depressed directly below the wheels, forming wells, and the wheels are set down in these wells far enough to insure that the buckets shall be completely immersed in the mercury even when the level of the mercury has fallen below the bottom of the reservoir. This construction is best shown in Figs. 7 and 8. To insure that the buckets shall all deliver the same quantity of mercury at all times, it is well to so construct them that when full they will spill a little of their mercury before they begin to discharge into the apron.

36 and 36′, Figs. 1, 6, 7 and 8, are floats hung from the rods 37 and 38, which are attached to the contact-levers 41 and 42, which levers are pivotally secured to brackets 45 and 46, and which carry the contact-points 43 and 44. The brackets 45 and 46 are fastened to the top of the reservoirs B and C respectively, but are insulated therefrom by the insulating-strips 47 and 48. The rods 37 and 38 are formed in two parts, as shown in Fig. 6, the parts being connected by the insulating-couplings 39 and 40. The contact-levers and contact-points are therefore insulated from the rest of the mechanism of the register and from each other. Binding-posts are attached to the brackets 45 and 46, and to these binding-posts are attached the wires forming the signal-circuit.

The floats 36 and 36′, as shown in Figs. 6, 7 and 8, work in float-chambers 50 and 51. The float-chamber 50 is a tube extending upward from the top of the reservoir B. The float-chamber 51, however, is a tube which passes through the reservoir C and through its bottom, and forms a well, which, as shown in Fig. 7, is in communication with the wells in which the bucket-wheels 21 and 33 work.

The floats 35 and 36 rest on the surface of the mercury in their respective reservoirs, and variations of the level of the mercury in the two reservoirs will therefore cause a change in the position of the contact-levers and the contact-points attached thereto. The adjustment of the contact-levers and contact-points is such that when the level of the mercury in the two reservoirs is the same the contact-points will be together; but when through the action of the bucket-wheel 7 the level of the mercury in the reservoir B is lowered and the level of the mercury in the reservoir C is raised this difference in level will cause a separation of the contact-points 43 and 44, breaking the signal-circuit, which will then remain broken until the same quantity of mercury which was transferred from B to C is transferred back again.

In order to cause a sufficient separation of the contact-points to break the circuit when only one wheel even has passed over the track-instrument, it is necessary that there should be a considerable separation of the contact-points produced by the withdrawal of the first drop of mercury from B and its transfer to C. It is desirable, however, that after the withdrawal of the first few drops of mercury the contact-points shall have only a very slight movement, as otherwise too great amplitude of movement would be required. To accomplish this end, the float-chambers mentioned above are provided. As shown in Fig. 6, the normal level of the mercury in the two reservoirs is such that the reservoir B is completely filled and the mercury rises into the float-chamber 50. In reservoir C, however, the mercury does not rise to the level of the bottom of the reservoir, but is entirely within the wells in the bottom of the reservoir. Therefore the abstraction of a very small quantity of mercury from reservoir B and its addition to reservoir C will cause a comparatively great change in the level of the mercury in the two reservoirs, causing a great separation of the contact-points, but when the level of the mercury in B has fallen below the top of the reservoir proper and when the mercury in C has risen far enough to overflow the bottom of that reservoir then it will require the abstraction of a comparatively large quantity of mercury from B and its addition to C to produce a perceptible effect on the contact-points. In like manner when mercury is transferred back from C to B the contact-points are moved only slightly until the level of the mercury in C has fallen below the bottom of the reservoir, and until the mercury has risen into the float-chamber 50 of B, when the addition of a very slight amount of mercury to B and its abstraction from C suffices to produce a comparatively great movement of the contact-points.

A set-screw 49, supported from an extension of the bracket 46, serves to limit the upward movement of the lever 42. The rods 37 and 38, which carry the floats 36 and 36', pass through guides in their lower ends, these guides being attached to the walls of the reservoirs. The valve-rod H likewise passes through a similar guide in the valve-chamber.

Since the level of the mercury in the reservoirs does, or may, rise above the level of the tops of the reservoirs, it is necessary to surround the bucket-wheels with cases, which form upward extensions of the tops of the reservoirs and which prevent mercury from escaping or from being splashed out around the bucket-wheels. This construction is shown most fully in Figs. 1, 2, 3 and 4.

I have arranged the registering mechanism to be operated by a normally-closed circuit which is broken by each wheel as it passes over the track-instrument. The canceling mechanism, however, is operated by a normally-open circuit, which is closed by each wheel as it passes over the track-instrument. It is evident, however, that both registering and canceling mechanisms might be operated by either normally-open circuits or normally-closed circuits, if so desired, and my arrangement in this respect is arbitrary, though I believe it to be in general the best, since the breaking of a circuit can never cause signals already at "danger" to go to "safety," and the breaking of the registering-circuits will cause the signals to go to "danger." For the same reason I prefer that the valve-magnet shall be in a normally-closed circuit, so that the breaking of the circuit from any cause will result in the closing of the valve.

The registering-magnet P and the reverse canceling-magnet T are connected with the track-instrument at the station where the register is situated, the registering-circuit being broken and closed by a train going onto the block, while the reverse canceling-circuit is closed and broken only when a train which has already passed onto the block from that end of the block backs off from it again. The canceling-magnet is connected with the track-instrument at the other end of the block.

Fig. 9, as previously stated, is a diagram taken from the drawings of my application for a registering system of electric railway-signals, and is here shown to make clear the way in which the various magnets of the register are connected to the track-instrument circuits. The full-line circuit goes from the positive pole of battery 60, which is a closed-circuit battery, through the normally-closed contact-points 61 of the track-instrument to 62, where it divides, one branch going through the registering-magnet P to 63, and thence back to the negative pole of battery 60. The other branch from 62 goes through the contact-points 43 and 44, which it will be remembered are in contact only when the level of the mercury in the two reservoirs is the same, to 64, through the contact-points of the relay, which need not be here considered, since it forms no part of the register, and thence through the signals 65 and 65' to the negative pole of battery 60. Another branch goes from 64 through the valve-magnet L to 63. Another branch goes through the magnet of the "governor" 68, the function of which need not be here considered, and so back to battery. All of these magnets are energized only when the contact-points 61 are together, and the separation of contact-points 43 and 44 of the register will prevent the energizing of the magnet of the governor 68 and of the valve-magnet L. The contact 61 is broken by each wheel as it passes over the track-instrument and into the block, being closed again immediately after the passage of the wheel; but the passage of the first wheel over the track-instrument will cause the operation of the registering mechanism, and, as will be seen when the operation of the register is described, will cause the separation of the contact-points 43 and 44, so that after the passage of the first wheel the valve E must be closed and the armature of the governor 68 be down, and these parts will so remain until the level of the mercury in the two reservoirs is brought back to the same point by the operation of the canceling mechanism.

The two canceling-magnets R and T are in broken-line circuits, which are normally open. The canceling-magnet R is in a circuit which goes to the signal-station at the other end of the block (not here shown) and is there connected to a normally-open contact of the track-instrument located there, which contact is closed only when a train is leaving the block at that end, and which is closed as each wheel of train passes over the track-instrument and is broken immediately thereafter. The reverse canceling-magnet is connected to the contact-points 67 of the track-instrument at the end of the block at which the register is located, and these contact-points are operated only when a train already within the block is passing over that track-instrument and out of the block. The circuit of these contact-points 67 passes through contact-points of the governor 68, which is so operated that the closing of contact 67 can affect the reverse canceling-magnet T only when a train which operated the registering mechanism of the register when entering the block is backing out of the block.

When, by the operation of the canceling mechanisms, the contact-points 43 and 44 are brought together, the full-line circuit is completed, the signals restored to "safety," and the valve E is opened by the valve-magnet L.

The operation of my register is as follows: When the first wheel of a train enters the block the contact-points of the track-instrument at that end of the block are separated, breaking the circuit of the registering-magnet P and releasing the armature 12 and armature-lever 11, which are then drawn away from the magnet by the spring 14, the pawl 10 carrying with it the wheel 9. The adjustment of the set-screws 15 and 16 is such that the wheel 9 is carried only far enough beyond the space of one tooth to allow the pawl 17 to drop and hold the wheel 9 in that position. When the wheel has passed over the track-instrument the circuit is again completed, and the magnet P attracts the armature 12, carrying back the lever 11 and the pawl 10, which then engages with another tooth of the wheel 9. The signal-circuit is likewise broken by the separation of the contact-points of the track-instrument, thus setting to "danger" the signals, and the armature K of the valve-magnet L is released, closing the valve E between the reservoirs. The bucket-wheel 7 has the same number of buckets that the wheel 9 has teeth, and therefore the movement of the wheel 9 through the distance of one tooth will cause one of the buckets of the wheel 7 to move to a position where it will begin to discharge its load of mercury into the apron 19, and will cause one of the buckets to emerge from the mercury in the reservoir B, thus lowering the level of the mercury in B and raising it in C, and separating the contact-points 43 and 44, so that when the contact-points of the track-instrument are brought together after the passage of the first wheel the signal-circuit remains unbroken. The passage of subsequent wheels over the track-instrument causes more buckets to rise and discharge mercury into the apron 19, from whence it passes to the reservoir C, increasing the distance between the contact-points 43 and 44, increasing the amount of mercury in C, and decreasing the amount of mercury in B by an amount which is equal to the volume of mercury contained in one bucket multiplied by the number of buckets which have discharged—i. e., the number of wheels that have operated the track-instrument. When the train has reached the other end of the block and passes out it operates contact-points of the track-instrument there, thus causing the operation of the canceling mechanism of the magnet R. Closing the circuit around the magnet R causes the armature 26 to be attracted, carrying with it the lever 25 and pawl 24, and moving the wheel 23 through the space of one tooth. As with the wheel 9, the set-screws 31 and 32 are so adjusted as to permit the lever 25 to move the wheel 23 only so much farther than the space of one tooth as is necessary to permit the pawl 29 to drop and hold the wheel 23 and so to prevent it from moving backward. When the circuit around the magnet R is broken the armature 26 and armature-lever 25 are released and are drawn back by a spring 28, causing the pawl 24 to engage with another tooth of the wheel 23. When the wheel 23 is rotated it causes a similar movement of the bucket-wheel 21, which, as with the wheel 7, for each space through which the wheel 23 is moved deposits a bucket of mercury into the apron 35, whence it flows to the reservoir B, and, since all of the buckets are of the same size, when the same number of buckets of mercury have been discharged back into the reservoir B that were first discharged from B into C the level of the mercury in the two reservoirs will be the same, the contact-points 43 and 44 will be brought together, the signal-circuit will be completed, thus restoring the signals to "safety," and the valve-magnet L will attract the armature K, drawing up the valve-plug F and re-establishing communication between the reservoirs.

The passage between the reservoirs is provided for the reason that should there be a very slight difference in the quantity of mercury carried over by the wheels 7 and 21, respectively, even though not enough to affect the operation of the contact-points at once, a slow accumulation of mercury in the one reservoir or the other would take place and the contact-points would soon either become permanently separated or would not be separated until a number of wheels had actuated the registering mechanism and transferred mercury to reservoir C. By providing communication between the reservoirs, the passage being automatically closed as the first wheel passes over the track-instrument and opened when the last wheel has left the block, I make such accumulation impossible, the mercury in the two reservoirs being equalized after the passage of each train from the block.

In the event of a train entering the block and then backing out at the same end from which it entered, the magnet T would come into use, causing the wheel 33 to revolve through similar mechanism to that connected with the magnet R, thus discharging mercury into the apron 35. It is apparent that all of the wheels 7, 21, and 33 may be in operation at the same time without interfering with each other.

I have preferred to use mercury in my register because it is perfectly liquid, is not greatly subject to evaporation, does not freeze at ordinary temperatures, is heavy, so that large floats need not be employed, and does not adhere to most substances, so that the amount of liquid carried over by the buckets is not affected by the adhesion of the liquid to the buckets. It would, however, be equally possible to use other liquids, such as oil, or even water mixed with some other substance to prevent it from freezing; or it is apparent that I might adapt my mechanism to use small solid bodies like shot, in which case balances would have to be substituted for the floats, which form means for comparing volumes. The requirement of the register is that some divisible substance be used as the registering medium, and it is immaterial, so far as the principle of the register is concerned, whether the contact-points be operated by mechanism operated by variations in weight or by variations in volume.

It is evident that other registering mechanisms and other canceling mechanisms may be added where it is necessary to provide for registering and canceling from several different points at once, and all of the registering and canceling mechanisms may be operated at any one time without interfering with each other in the least.

If the track-instrument be arranged to operate only for the separate trucks, cars, or trains, the register will of course register such trucks, cars, or trains as units, instead of registering wheels as units, as above described.

Having thus completely described my invention, its construction and operation, what I claim, and desire to secure by Letters Patent, is—

1. The combination, with a block or section of track, signals and signal operating mechanism therefor, and a track-instrument operated by the passage of a train over said track, of a register having suitable vessels with a divisible substance therein, mechanism operated by the track-instrument and arranged to transfer from one vessel to another a quantity of the divisible substance proportional to the number of times said track-instrument is operated, and mechanism operated by variations in the quantity of divisible substance within the several vessels for controlling the said signal operating mechanism, substantially as described.

2. The combination, with a block or section of track, signals and signal operating mechanism therefor, and track-instruments at the ends of said block and operated by trains passing on said block, of a register at one end of said block having two reservoirs with a divisible substance therein, registering mechanism operated by the track-instrument at the near end of said block and adapted when a train operates said track-instrument in passing into the block to transfer from one reservoir to a second reservoir a quantity of divisible substance proportional to the number of times said track-instrument is operated, canceling mechanism operated by both track-instruments of the block adapted, when trains operate said track-instruments in passing out of the block, to transfer from the second reservoir to the first a quantity of divisible substance proportional to the number of times said track-instruments are operated, and mechanism operated by variations in the quantity of divisible substance within the reservoirs for controlling the said signal operating mechanism, substantially as described.

3. In a register, the combination, with two vessels and a divisible substance therein, of step-by-step mechanism for transferring the divisible substance from one vessel to the other, and contact points actuated by variations in the quantity of divisible substance within the respective vessels, substantially as described.

4. The combination, with a section of railway track, and signals and electrically controlled signal operating mechanism therefor, of a register having two vessels with a divisible substance therein, step by step mechanism operated by trains passing over the track for transferring the divisible substance from one vessel to the other, and mechanism, operated by variations in the relative quantity of divisible substance within said vessels, for controlling said signal operating mechanism, substantially as described.

5. The combination, with a section of railway track, and signals and electrically controlled signal operating mechanism therefor, of a register having two reservoirs containing a fluid substance, bucket conveyers for each reservoir adapted to remove fluid therefrom and deposit the same, an apron for each conveyer adapted to receive the fluid so deposited, a passage leading from each apron to the opposite reservoir and adapted to convey the fluid from the apron to the reservoir, and mechanism, operated by variations in the relative quantity of fluid within said vessels, for controlling said signal operating mechanism, substantially as described.

6. The combination, with a section of railway track, and signals and electrically controlled signal operating mechanism therefor, of a register having two reservoirs containing a fluid substance, conveyers and operating mechanism therefor for transferring the fluid from one reservoir to the other, mechanism operated by variations in the relative quantity of fluid within said reservoirs for controlling said signal operating mechanism, a passage connecting the said reservoirs, an equalizing valve in said passage, and means for operating said valve, substantially as described.

7. The combination, with a section of railway track, and signals and electrically controlled signal operating mechanism therefor, of a register having two reservoirs containing a fluid substance, conveyers and operating mechanism therefor for transferring the fluid from one reservoir to the other, contact points controlling the circuit of said signal operating mechanism and operated by variations in the level of the fluid within said reservoirs, said contact points being arranged to be in contact when the level of the fluid in the two reservoirs is the same, a passage connecting the reservoirs, an equalizing valve in said passage, and mechanism for operating said valve, arranged to automatically close said valve when the register is operated, substantially as described.

8. The combination, with a section of railway track, and signals and electrically controlled signal operating mechanism therefor, a register having two reservoirs, B and C, containing a fluid substance, and means for transferring fluid from each reservoir to the other, of a float chamber 50 in communication with said reservoir B and rising above the top of the same, a float in said chamber, a contact point 43 controlled by said float and a contact point 44 engaging the said contact point 43, substantially as described.

9. In a register, the combination, with two reservoirs, B and C, and means for transferring fluid from each reservoir to the other, of a float chamber 51 in communication with said reservoir C and extending below the bottom of the same, a float in said chamber, a contact point 44 controlled by said float, and a contact point 43 engaging with said contact point 44, substantially as described.

10. In a register, the combination, with a reservoir B, of a reservoir C on a higher level than said reservoir B, means for transferring fluid from one reservoir to the other, a float chamber 50 in communication with and rising above the top of reservoir B, a float chamber 51 in communication with and extending below the bottom of reservoir C, floats within said float chambers, and contact points operated thereby, substantially as described.

In testimony whereof I affix my signature in presence of two witnesses.

THOS. B. DIXON.

Witnesses:
H. M. MARBLE,
J. ALEX. STITT.